H. P. WRIGHT.
Steam Generators.

No. 141,974. Patented August 19, 1873.

Witnesses:
Chas. Nida
Sedgwick

Inventor:
H. P. Wright
Per
Attorneys.

UNITED STATES PATENT OFFICE.

HARRY P. WRIGHT, OF BONAPARTE, IOWA.

IMPROVEMENT IN STEAM-GENERATORS.

Specification forming part of Letters Patent No. 141,974, dated August 19, 1873; application filed June 21, 1873.

*To all whom it may concern:*

Be it known that I, HARRY P. WRIGHT, of Bonaparte, in the county of Van Buren and State of Iowa, have invented a new and Improved Steam-Generator, of which the following is a specification:

My invention consists of secondary return-flues, arranged in the masonry along the sides of the boiler, above the furnace, into which the heat is turned at the front of the boiler, instead of discharging into the smoke-stack, and caused to pass again along the boiler against the sides, before escaping into the chimney, thus economizing the heat by causing it to pass along the boiler once more than in other arrangements, and I also propose to connect these flues at the escaping ends with a long under-ground passage, through which to pass the draft before coming to the chimney, by which I increase the draft largely.

Figure 1:
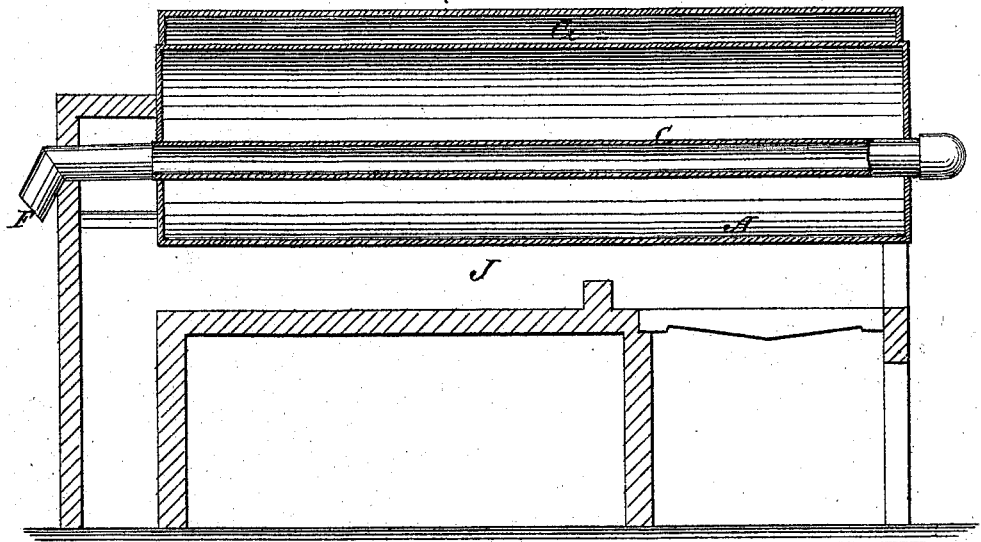
Figure 2:
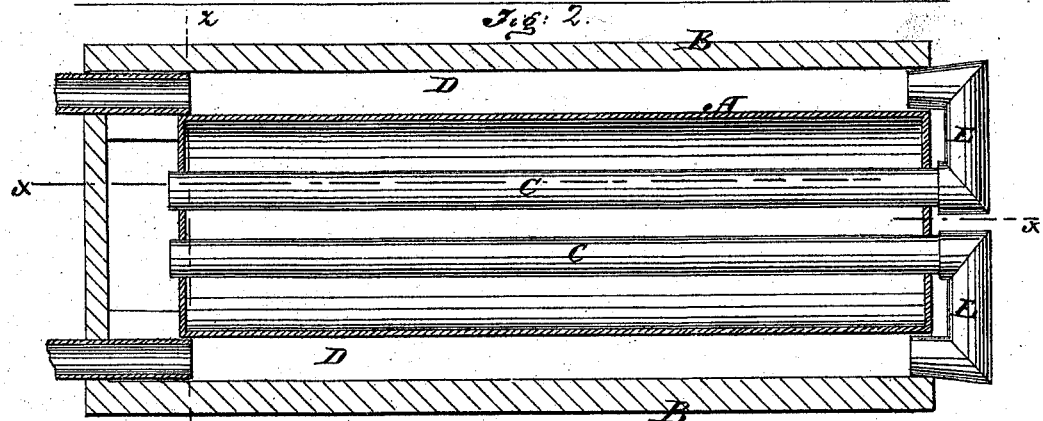
Figure 3:
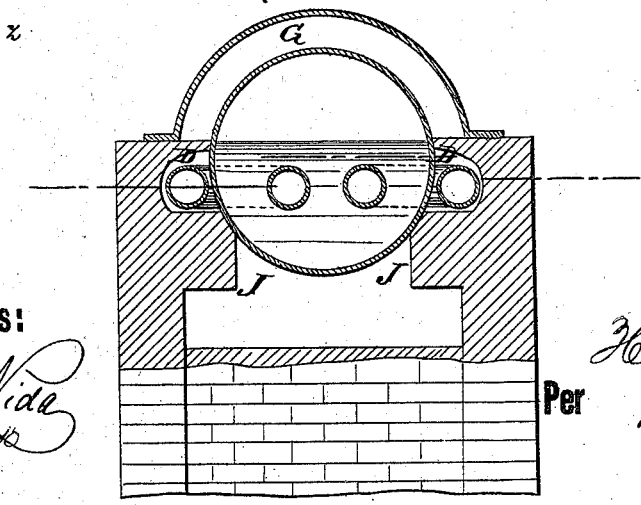

Figure 1 is a longitudinal sectional elevation of a steam-generator arranged according to my invention, the section being taken on the line $x\,x$ of Fig. 2. Fig. 2 is a horizontal section taken on the line $y\,y$ of Fig. 3, and Fig. 3 is a transverse section taken on the line $z\,z$ of Fig. 2.

Similar letters of reference indicate corresponding parts.

A is the boiler, B the masonry setting, and C the return-flues, of the ordinary arrangement. D represents the secondary return-flues, which I make in the masonry along the sides of the boiler, and into which I cause the draft to pass through the return-bends E, and thus economize much of the heat now lost in the chimney. Instead of discharging the draft directly from these flues into the chimney, I propose to connect them by suitable flues F, extending downward with a long under-ground passage, through which I will cause the draft to pass before entering the chimney, for the purpose of increasing the force. Above the boiler I propose to have a heat-retaining chamber, G, arched over with brick, to prevent the escape of heat; and in practice I will have the fire-chamber J below connected with this chamber by, say, two flues on each side, with valves, which may be opened to admit the heat up to it when firing up, to heat the top of the boiler sooner than it would otherwise heat. When the said chamber has become heated I will shut the valves and keep them shut, to retain the heat until I wish to let the steam go down, or stop; then I will open them and let the heat escape into the chimney.

Having thus described my invention, I claim as new and desire to secure by Letters Patent—

The combination, with a steam-generator, of the secondary return-flues D, arranged by the sides of the generator, in the masonry setting, and connected with the flues C and the passage to the chimney, substantially as specified.

HARRY P. WRIGHT.

Witnesses:
D. W. STUTSMAN,
WM. S. BROWN.